United States Patent [19]
Lewis et al.

[11] 3,779,006
[45] Dec. 18, 1973

[54] FLAME SHIELD FOR A GAS TURBINE ENGINE

[75] Inventors: Brynley Lewis, Nottingham; George Langham Miller, Spondon; Kenneth John Brooks, Nottingham; Arthur George Goss, Derby, all of England

[73] Assignee: The Secretary of State for Defense in Her Britannic Majesty's Government of the United Kingdom of Great Britain and Northern Ireland, London, England

[22] Filed: Nov. 4, 1971

[21] Appl. No.: 195,612

[30] Foreign Application Priority Data
Nov. 30, 1970 Great Britain.................. 56,738/70

[52] U.S. Cl.................. 60/39.11, 60/39.31, 244/54
[51] Int. Cl. ......................... F02g 3/02, F16p 1/02
[58] Field of Search.................. 60/200 A, 39.09 R, 60/39.31, 39.11; 244/1 SC, 117 A, 121, 54; 102/105

[56] References Cited
UNITED STATES PATENTS

| | | | |
|---|---|---|---|
| 3,357,657 | 12/1967 | Ferrel et al. ......................... | 244/54 |
| 2,706,382 | 4/1955 | Logan et al..................... | 60/200 A |
| 3,460,759 | 8/1969 | Gregory et al.................... | 60/200 A |
| 3,122,883 | 3/1964 | Terner...................... | 60/200 A |
| 3,264,135 | 8/1966 | Wakelyn et al................... | 60/200 A |
| 3,321,922 | 5/1967 | Latto ............................... | 60/200 A |
| 2,805,192 | 9/1957 | Brenner............................ | 60/200 A |
| 2,711,631 | 6/1955 | Willgoos........................... | 60/39.31 |

FOREIGN PATENTS OR APPLICATIONS

| | | | |
|---|---|---|---|
| 868,197 | 5/1961 | Great Britain................. | 60/39.09 R |
| 1,946,085 | 3/1970 | Germany....................... | 60/39.09 R |

OTHER PUBLICATIONS
Rocket Refractories Nayord Report 4893, Nots, 1191, China Lake, California, 26 Aug. 1955 pgs. 11, 12-17 inclusive.

Primary Examiner—Carlton R. Croyle
Assistant Examiner—Warren Olsen
Attorney—Cushman, Darby & Cushman

[57] ABSTRACT

A flame shield for a gas turbine engine comprises a sheet of refractory metal, preferably tantalum, having at least on the side subject to flame attack a material which prevents oxidation of the sheet and on the other side an insulating layer. The flame shield is so positioned and so dimensioned that in the event of failure of the combustion equipment of a gas turbine engine in an aircraft, any flame issuing therefrom is prevented from coming into contact with other parts of the engine or the aircraft fuselage for a predetermined length of time.

11 Claims, 3 Drawing Figures

FLAME SHIELD FOR A GAS TURBINE ENGINE

This invention relates to flame shields for gas turbine engines.

According to the present invention, to which, however, the invention is in no way restricted, there is provided a flame shield for a gas turbine engine comprising a sheet of refractory metal having on at least the side subject to flame attack a coating of a material which prevents oxidation of the sheet and on the other side an insulating layer.

The coating may be a silicide-based compound. Alternatively, said coating may be an alumina coating. Instead said coating may be a layer of a hafnium based alloy. Preferably, said hafnium based alloy includes a percentage by weight of tantalum. Said coating may also be an aluminium-tin alloy coating. In this case, said coating preferably contains substantially equal amounts by weight of aluminum and tin.

Said insulating layer preferably comprises a first layer of an asbestos-containing material and a second layer of a quartz-containing material.

In a preferred embodiment a further sheet is provided, said insulating layer being sandwiched between the said sheet of refractory metal and said further sheet. Said further sheet may be made of steel.

According to a further non-restrictive aspect of the present invention there is provided a gas turbine engine having a casing within which is mounted compressor means, combustion equipment and turbine means, and a flame shield disposed between said combustion equipment and that part of the aircraft to be protected.

Said gas turbine engine may include a fan mounted within a fan duct and mounting means comprising a strut extending across said fan duct, said flame shield being disposed between said combustion equipment and said strut to protect the same.

Said flame shield may be arcuate, the ends of the flame shield subtending an angle of 85° at the engine axis.

The invention is illustrated, merely by way of example, in the accompanying drawings, in which.

Figure 1:
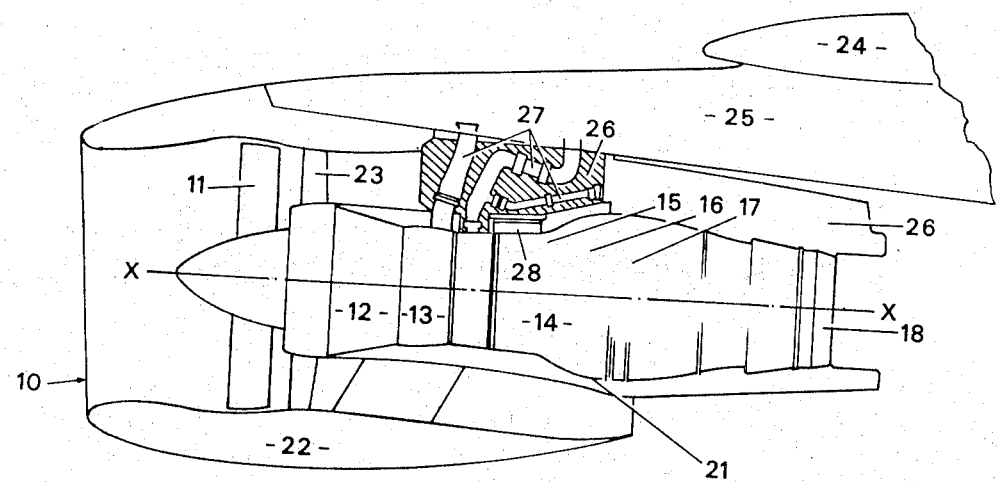
FIG. 1 is a view, partly in section, of a ducted fan gas turbine engine having a flame shield according to the present invention.
Figure 3:
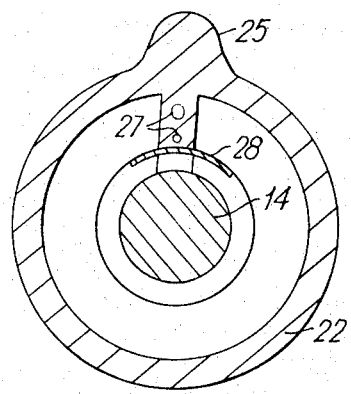
FIG. 3 is a cross-section of the gas turbine engine of FIG. 1.

Referring first to FIG. 1, there is shown a ducted fan gas turbine engine 10 comprising in flow series a single stage fan 11, intermediate and high pressure compressors 12, 13, combustion equipment 14, high and intermediate pressure turbines 15, 16 which are drivingly connected to the high and intermediate pressure compressors 13, 12, respectively, a low pressure turbine 17 which is drivingly connected to the fan 11, and an exhaust duct 18.

The intermediate and high pressure compressors 12, 13, the combustion equipment 14, and the high, intermediate and low pressure turbines 15, 16, 17 are mounted within a casing 21. Surrounding the upstream part of the casing 21 is a fan duct 22 which houses the fan 11. The fan duct 22 is supported from the casing 21 by an annular array of outlet guide vanes 23.

The ducted fan gas turbine engine 10 is supported from a wing 24 of an aircraft (not shown) by a pylon 25 which is connected to the fan duct 22. A strut 26 extends between the casing 21 and the pylon 25, the strut being of aerodynamic cross-section. The strut 26 is hollow and a plurality of service pipes 27 pass therethrough. One of the service pipes 27 may, for example, direct air from the downstream end of the high pressure compressor into the interior of the aircraft for cabin pressurisation and/or heating.

The casing 21 is provided with a flame shield 28 which is circumferentially disposed between the combustion equipment 14 and the strut 26. The flame shield 28 is arcuate and, preferably extends over an arc whose ends subtend an angle of 85° to the axis X-X of the ducted fan gas turbine engine 10. The flame shield is connected to and rigidly supported from the casing 21 by any suitable means (not shown).

The flame shield 28 is so positioned and so dimensioned that in the event of failure of the combustion equipment 14, any flame issuing therefrom is prevented from coming into contact with the strut 26 and/or the pylon 25 for a predetermined length of time. It will be appreciated that if the flame is allowed to come into contact with either the strut 26 or the pylon 25, extensive damage will occur very quickly and may jeopardize the safety of the aircraft. The said predetermined length of time is, of course, dependent upon many factors but, for example, the Federal Aviation Agency require in "Condition P1" that the flame shield must be capable of preventing the flame from the combustion chamber 14 from coming into contact with the struts 26 or the pylon 25 for a length of time in excess of two minutes.

Figure 2:
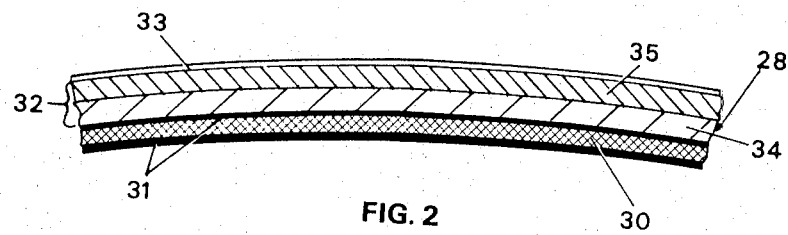
FIG. 2 is a cross-section through a part of a flame shield according to the present invention.

Referring now to FIG. 2, there is shown, in cross-section, a part of the flame shield 28. The flame shield 28 comprises a sheet 30 of a refractory metal having on both sides an anti-oxidising coating 31 to prevent the sheet oxidising during flame attack. On the side of the sheet 30 remote from the flame attack there is an insulating layer 32 sandwiched between the sheet and a further sheet 33 which acts as a load bearing structure. The sheet 30, insulating layer 32, and further sheet 33 may be retained together as a unitary structure by any suitable means (not shown), e.g. straps or location strips connected to the casing 21.

The sheet 30 is preferably made of tantalum but it may be made of other refractory metals e.g. niobium, molybdenum, tungsten, ductile chromium or an alloy of any of these refractory metals. When tantalum is used in the construction of the sheet 30 it is preferably of industrial purity, namely at least 99.5 percent tantalum.

The anti-oxidising coating 31 may be, for example, a coating of a silicide-based compound, e.g. that sold under the Trade Name "MURIDE T."

This anti-oxidising coating 31 may be applied to the sheet 30 by one of the following techniques: by dipping the sheet in a silicone-based slurry; by brushing the sheet with a silicone-based slurry; by spraying the sheet with a silicone-based dispersion; by flame or plasma arc spraying with a silicone-based slurry. These techniques are followed by a high temperature vacuum diffusion treatment of the coating which converts the silicone component to a silicide component of the coating.

However, other anti-oxidising coating may be used. Thus an anti-oxidising coating of a flame sprayed alumina with a sealing glaze of high temperature glass may be employed, the glass being sprayed onto the sprayed alumina in an aerosol dispersion and then fired. Alternatively, the anti-oxidising coating may be a slurry of aluminium powder in an organic solvent which is allowed to oxidise during a diffusion treatment. Instead, the anti-oxidising coating may be a cladding layer of hafnium alloy which contains 20 – 27 percent by weight of tantalum. In this case the sheet 30 is sandwiched between two 0.015 inch thickness layers of this alloy. When a flame shield of this type is subjected to flame attack the layers of the alloy oxidise to form a protective layer. A further type of anti-oxidising coating may be an aluminium-tin alloy coating which is applied in the form of a slurry in an organic solvent and then diffused at high temperature. This coating preferably contains substantially equal amounts by weight of aluminium and tin.

The anti-oxidising coating may be between 0.001 inch and 0.015 inch in thickness.

The insulating layer 32 may, for example, be a first layer 34 adjacent the sheet 30, of the material sold under the Trade Name "MICRO-BESTOS" which comprises asbestos fibres impregnated with phenolic resin, and a second layer 35, disposed between the first layer 34 and the further sheet 33, of the material sold under the Trade Name "MICRO-QUARTZ" which comprises a felt made of at least 98½ percent silica fibres. The further sheet 33 may be made of steel.

In one example of a flame shield according to the present invention, the sheet 30 was a sheet of tantalum 0.024 inch thick, the layer 34 was a layer of "MICRO-BESTOS" 0.125 inch thick, the layer 35 was a layer of "MICRO-QUARTZ" 0.5 inch thick, and the further sheet 33 was a sheet of steel 0.049 inch thick. In one experiment a flame shield having the above construction was attacked by a flame with a temperature of 2,000°K applied perpendicular to its surface and, after 3 minutes and 20 seconds a small hole had been formed through the flame shield.

In order to protect the anti-oxidising coating 31 on the side of the sheet 30 subject to flame attack from physical damage, a thin protective metal sheet (not shown) of any suitable material may be placed over it.

Although the flame shield 30 has been described in relation to a ducted fan gas turbine engine, it will be appreciated that it is applicable to any gas turbine engine. For example, if a gas turbine engine is mounted within the aircraft fuselage the flame shield will completely surround the combustion equipment. Basically, therefore, the flame shield is disposed between the combustion equipment and that part of the aircraft structure that is to be protected.

Although the sheet 30 is shown with an anti-oxidising coating 31 on both sides it will be appreciated that, in certain circumstances, the anti-oxidising coating 31 may merely be provided on the side of the sheet 30 subject to flame attack.

We claim:

1. A gas turbine engine for an aircraft and having a casing within which is mounted compressor means, combustion equipment and turbine means in flow series, and a flame shield disposed on said combustion equipment so that the flame shield is positioned between the combustion equipment and a part of the aircraft to be protected when the engine is mounted on the aircraft, said flame shield comprising a sheet of refractory metal having on at least the surface adjacent said combustion equipment a coating of a material which prevents oxidation of the sheet and on the other side an insulating layer.

2. A gas turbine engine as claimed in claim 1 wherein the material of said coating is selected from the group comprising a silicide-based compound, alumina, a hafnium based alloy and an aluminium-tin alloy.

3. A gas turbine engine as claimed in claim 2 wherein said hafnium based alloy contains tantalum.

4. A gas turbine engine as claimed in claim 2 wherein said aluminium-tin alloy contains substantially equal amounts by weight of aluminium and tin.

5. A gas turbine engine as claimed in claim 1 wherein said insulating layer comprises a first layer of an asbestos-containing material and a second layer of a quartz containing material.

6. A gas turbine engine as claimed in claim 1 in which a further sheet is provided, said insulating layer being sandwiched between the said sheet of refractory metal and said further sheet.

7. A gas turbine engine as claimed in claim 6 wherein said further sheet is made of steel.

8. A gas turbine engine as claimed in claim 1 wherein the said refractory metal is selected from the group comprising tantalum, niobium, molybdenum, tungsten, ductile chromium and any alloy of these refractory metals.

9. A gas turbine engine as claimed in claim 1 including a fan mounted within a fan duct and mounting means comprising a strut extending across said fan duct, said strut being a part of the aircraft to be protected, said flame shield being disposed between said combustion equipment and said strut.

10. A gas turbine engine as claimed in claim 9 wherein said flame shield is arcuate, the ends of said flame shield subtending an angle of 85° at the engine axis.

11. A gas turbine engine as claimed in claim 1 wherein said insulating layer comprises a first layer of asbestos fibers impregnated with a phenolic resin and a second layer of silica fibers.

* * * * *